United States Patent [19]

Kawamura et al.

[11] Patent Number: 4,899,096
[45] Date of Patent: Feb. 6, 1990

[54] INVOLUTE INTERPOLATION SPEED CONTROLLING METHOD

[75] Inventors: Hideaki Kawamura, Hachioji; Kentaro Fujibayashi, Musashino; Toshiaki Otsuki, Hino, all of Japan

[73] Assignee: Fanuc LTC, Minamitsuru, Japan

[21] Appl. No.: 309,669

[22] Filed: Feb. 7, 1989

[30] Foreign Application Priority Data

Jun. 24, 1987 [JP] Japan .................... 62-157302

[51] Int. Cl.[4] .................. G05B 19/41; G05B 19/415
[52] U.S. Cl. .................. 318/573; 318/568.15; 318/567; 364/474.29; 364/474.31; 364/513
[58] Field of Search .................. 318/560-578, 318/603; 364/474.29, 474.30, 474.31, 474.32, 474.33, 474.34, 513; 901/3, 9, 15, 20-24

[56] References Cited

U.S. PATENT DOCUMENTS

| | | | |
|---|---|---|---|
| 4,423,481 | 12/1983 | Reid-Green et al. | 318/573 X |
| 4,590,577 | 5/1986 | Nio et al. | 364/513 |
| 4,689,750 | 8/1987 | Kishi et al. | 364/474.29 |
| 4,703,146 | 10/1987 | Kinoshita | 318/572 X |
| 4,716,350 | 12/1987 | Huang et al. | 364/513 X |
| 4,791,575 | 12/1988 | Watts, Jr. et al. | 364/474.29 |
| 4,791,576 | 12/1988 | Tanaka et al. | 364/474.29 |

FOREIGN PATENT DOCUMENTS

| | | | |
|---|---|---|---|
| 0205708 | 8/1988 | Japan | 318/568.15 |
| 8902111 | 3/1989 | World Int. Prop. O. | 364/474.31 |

*Primary Examiner*—William M. Shoop, Jr.
*Assistant Examiner*—Paul Ip
*Attorney, Agent, or Firm*—Staas & Halsey

[57] ABSTRACT

An involute interpolation method for use in machining by a numerical control apparatus.

A rotational direction (G03.1) of an involute curve, coordinates of an end point (Xe, Ye), a center position (I, J) of a base circle as viewed from a start point, and a radius (R) of the base circle are instructed, from two equations representing the involute curve sequence of points are obtained, and interpolation of the involute curve is performed while interpolating those points in a range of the angle $\theta$ corresponding to the start point on the involute curve to the end point thereon.

The increment of $\theta$ is decremented in proportion to the increment of the angle owing to the factor $K/(R\cdot\theta)$, so that the interpolation is performed in such a manner that the speed in the tangential direction is made at constant, whereby a machining speed of the involute curve is maintained at constant.

2 Claims, 2 Drawing Sheets

INVOLUTE INTERPOLATION SPEED CONTROLLING METHOD

TECHNICAL FIELD

The present invention relates to an involute interpolation speed controlling method for machining operations in a numerical control apparatus or the like, and more particularly to an involute interpolation speed controlling method in which a speed in a tangential direction is made at constant irrespective of angles.

BACKGROUND ART

In a curve interpolation in association with a numerical control apparatus, interpolation of an involute curve has particularly been needed for machining gears, vanes of pumps and the like, and it has been a general practice to interpolate the involute curve with a computer or an NC program producing system which are distinctly provide from the numerical control apparatus to analyze a curve data into straight line data, whereupon numerical control machinings are performed with the use of a tape.

The same applicant filed a Japanese patent application No. 62-157303 on June 24, 1987 entitled "INVOLUTE INTERPOLATION METHOD" in which it is proposed to readily interpolate an involute curve in a numerical control apparatus.

According to the involute interpolation method proposed therein, coordinates of an arbitrary point on the involute curve are defined by the following equations:

$$X = R\{\cos(\theta + \theta 1) + \theta \sin(\theta + \theta 1)\} + X_O$$

$$[Y = R\{\sin(\theta + \theta 1) - \theta \cos(\theta + \theta 1)\} + Y_O$$

The angle is incremented at every predetermined value from $\theta = (\theta 2 - \theta 1)$ to $\theta = (\theta 3 - \theta 1)$ to sequentially plot points on the involute curve and then compute moving distances between adjacent two points, whereupon a straight line interpolation at a specified speed is performed.

However, since the increment of the angle $\theta$ is set at constant, a rotational radius of the involute curve increases attendant to the increment of the angle, thereby causing to increase the speed, and thus a problem is introduced in that a cutting speed is not maintained at constant.

DISCLOSURE OF THE INVENTION

An object of this invention is to resolve the above problem and to provide an involute interpolation speed controlling method in which a speed in the tangential direction is made at constant irrespective of an angle.

In order to resolve the above-noted problem, the invention provides, as illustrated in FIG. 1, in an involute interpolation speed controlling method for use in machining by a numerical control apparatus, an involute interpolation method for interpolating an involute curve comprising the steps of: instructing a rotational direction (G02.1, G03.1) of the involute curve, coordinates of an end point (Xe, Ye), a center position (I, J) of a base circle as viewed from a start point, and a radius (R) of the base circle;

obtaining coordinates ($X_0$, $Y_0$) of the center of the base circle of the involute curve, an angle ($\theta 2$) of the start point, an angle ($\theta 3$) of the end point and a curve start angle ($\theta 1$) on the basis of the instructions and coordinates (Xs, Ys) of the start point; and with respect to an involute curve represented by $$X = R\{\cos(\theta + \theta 1) + \theta \sin(\theta + \theta 1)\} + X_0$$

$$Y = R\{\sin(\theta + \theta 1) - \theta \cos(\theta + \theta 1)\} + Y_0$$

increasing $\theta$ in a range from $\theta = (\theta 2 - \theta 1)$ to $\theta = (\theta 3 - \theta 1)$ according to a relation defined by $$\theta_{n+1} = \theta_n + K/(R \cdot \theta)$$

to thereby obtain corresponding points $X_{n+1}$, $Y_{n+1}$ from the above equation.

From the two equations representing the involute curve, sequence of points are obtained, and interpolation of the involute curve is performed while interpolating those points in a range of the angle $\theta$ corresponding to the start point of the involute curve to the end point thereof.

The increment of $\theta$ is decremented in proportion to the increment of the angle owing to the factor $K/R \cdot \theta$), so that the interpolation is performed in such a manner that the speed in the tangential direction is made at constant.

BEST MODE FOR CARRYING OUT THE INVENTION

One embodiment of the present invention will be described with reference to the accompanying drawings.

Figure 1:
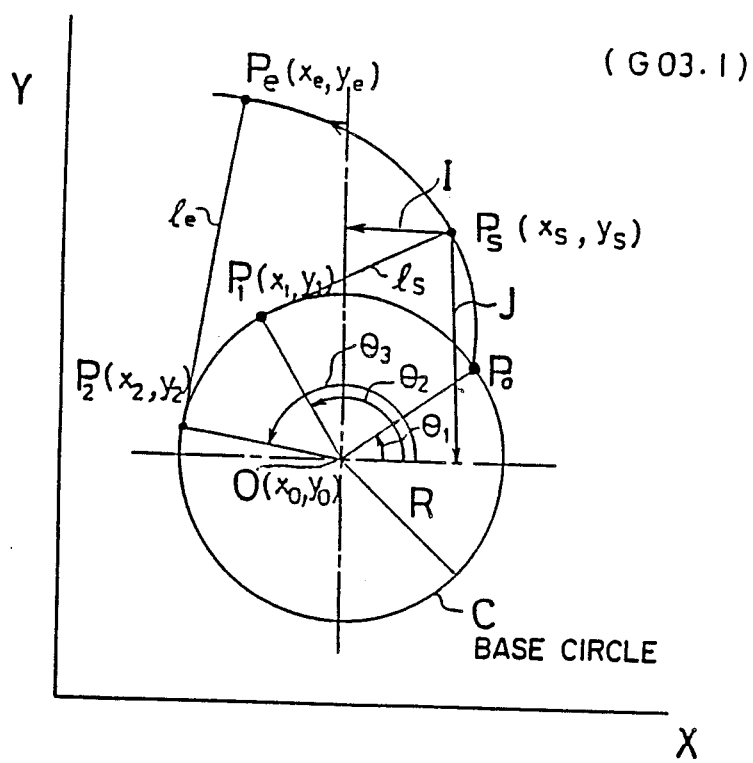
FIG. 1 is a diagram for description of an interpolation of an involute curve.

FIG. 1 illustrates an example of an involute curve rotating in counterclockwise direction leaving from a base circle, in which an instruction of G03.1 is given. There exists another kinds of involute curves such as approaching to the base circle or rotating in clockwise direction. Those curves are the same in principle, thus description will be made with reference to FIG. 1. In the figure, the involute curve is depicted with reference to a base circle C having a center represented on coordinates by O ($X_0$, $Y_0$) and a radius R. The involute curve starts with a point $P_0$ and an angle formed by a line connecting the point $P_0$ and the center O and an X axis is $\theta 1$.

A point Ps (Xs, Ys) is a start point for interpolation. A tangential line ls is drawn from this point to the base circle C and a point of contact of this tangential line with the base circle C is represented by P1 (X1, Y1). An angle that a line connecting the point P1 and the center O of the base circle intersects the X axis is represented by $\theta 2$.

A point Pe (Xe, Ye) is an end point for interpolation. From this point, a tangential line le is drawn to the base circle C and the point of contact of this tangential line with the base circle C is represented by P2 (X2, Y2). An angle that a line connecting the point P2 and the center O of the base circle intersects the X axis is presented by $\theta 3$.

An instruction for the involute interpolation is given by G17G03.1X—Y—I J—R—F—:. G17 is an instruction for specifying an X-Y plane, G18 for a Z-X plane and G19 for a Y-Z plane.

G03.1 is an instruction of interpolation for an involute curve rotating in a counterclockwise direction. Interpolation for an involute curve rotating in clockwise direction is given by G02.1. Whether the curve approaches the base circle or it leaves from the base circle is determined depending upon the coordinate values of the start and end points of the involute curve.

X—Y— represents coordinates of the end point of the involute curve, which in the figure, corresponds to Pe (Xe, Ye). Instruction for this is made with an absolute value.

I—J— is a value of the center of the base circle C as viewed from the start point Ps (Xs, Ys), which is instructed with an incremental value.

R— is a radius of the base circle and F— is a feeding speed. ";" is representative of an end-of-block.

Next, values for defining the involute curve are obtained based upon those instructions.

(1) Center Coordinates O of Base Circle

The coordinates of the start point Ps (Xs, Ys) of the involute curve are not contained in the instructions. However, such have been stored in the interior of the numerical control apparatus as a current position. Based upon a distance (I, J) from the start point Ps (Xs, Ys) to the center of the base circle of the involute curve as viewed from the start point, the center coordinates O ($X_0$, $Y_0$) of the base circle are obtained from the following equations.

$$X_0 = Xs + I$$

$$Y_0 = Ye + J.$$

(2) Angle $\theta 2$ at Start Point on Involute Curve

A tangential line ls is drawn to the base circle C from the start point Ps and the point of contact of this tangential line with the base circle C is represented by P1 (X1, Y1). Upon connecting the point P1 and the center 0 of the base circle C with a straight line, an angle that this line intersects the X axis is obtained. The angle thus obtained represents the angle $\theta 2$ of the start point on the involute curve.

(3) Angle $\theta 3$ at End Point on Involute Curve

A tangenial line le is drawn to the base circle C from the end point Pe (Xe, Ye) on the involute curve and the point of contact of this tangential line with the base circle C is represented by P2 (X2, Y2). Upon connecting the point P2 and the center of the base circle C with a straight line, and an angle that this line intersects the X axis is defined as the angle $\theta 3$ of the end point on the involute curve.

(4) Curve Start point angle $\theta 1$ of Involute Curve

A segment length between the point P1 and the point $P_0$ is equal to the length of the straight line ls according to the definition of the involute curve. Accordingly, representing the length of the straight line ls with L, $$\theta 1 = \theta 2 - L//R \text{ (unit: radian)}$$

the curve start point angle $\theta 1$ of the involute curve can be obtained from the above equation.

(5) From the foregoing values coordinates of an arbitrary point on the involute curve are given by the following equations.

$$X = R\{\cos(\theta + \theta 1) + \theta \sin(\theta + \theta 1)\} + X_0$$

$$Y = R\{\sin(\theta + \theta 1) - \theta \cos(\theta + \theta 1)\} + Y_0$$

With an increment if the angle $\theta$ at every predetermined value from $\theta = (\theta 2 - \theta 1)$ to $\theta = (\theta 3 - \theta 1)$, the radius of the involute curve increases attendant to the angle $\theta$ so that the speed increases in proportion to the angle. Accordingly, it is necessary that the increment of $\theta$ be controlled so that the tangential speed on the involute curve is maintained at constant.

From the above two equations, the following result:

$$(dX/d\theta) = R \cdot \theta \cdot \cos(\theta + \theta 1)$$

$$(dY/d\theta) = -R \cdot \theta \cdot \sin(\theta + \theta 1)$$

$$(dl/d\theta) = \sqrt{(dX/d\theta)^2 + (dY/d\theta)^2} = R \cdot \theta$$

Therefore, $$d\theta = (dl/R \cdot \theta)$$

Here, taking a difference, $$\Delta \theta_n = (\Delta l/R \cdot \theta)$$

since $\Delta l$ is a distance moving per a predetermined period of time, $$\Delta l = K = \tau \cdot (F/60)$$

where $\tau$ is a pulse distribution period (involute interpolation period) whose unit is second, F is a feeding speed whose unit is (mm/min). Accordingly, the increment of $\theta$ is given by the following equation:

$$\theta_{n+1} = \theta_n + \Delta \theta_n = \theta_n + K/(R \cdot \theta)$$

The values of $X_{n+1}$, $Y_{n+1}$ corresponding to the $\theta_{n+1}$ are obtained and a difference between those and the preceding values $X_n$, $Y_n$ are respectively outputted as distribution pulses, whereby the tangential speed of the involute curve can be controlled at constant.

Figure 2:
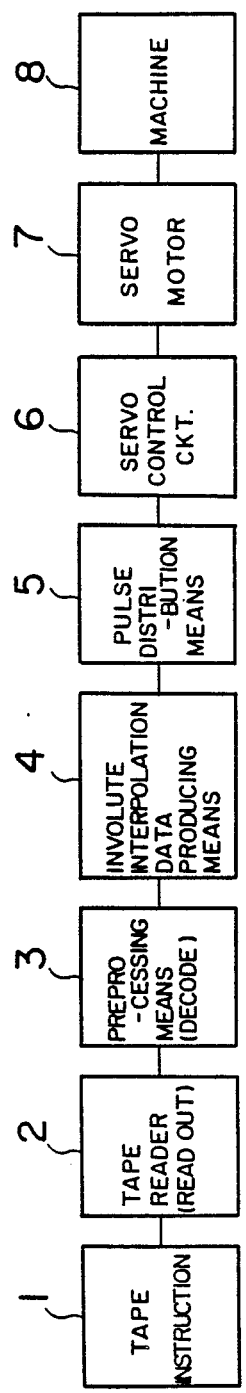
FIG. 2 is a diagram showing an outline of a numerical control appratus to one embodiment of the present invention.

FIG. 2 is a diagram showing an outline of a numerical control apparatus according to this embodiment. A tape instruction 1 is a punched tape containing the aforementioned instructions, and a tape reader 2 reads the tape 1. A preprocessing means 3 discriminates an involute interpolation instruction from a G code. An involute interpolation data producing means 4 produces data needed for the involute interpolation from the instructions. Designated by reference numeral 5 is a pulse distribution means, in which from the data produced by the involute interpolation data producing means 4, $\theta$ is incremented so that the tangential speed of the involute curve is maintained at constant in accordance with the above-noted equation. In this manner, the points on the involute curves are obtained, whereupon the interpolation is performed and the pulses are distributed. A servo control circuit 6 drives a servo motor in accordance with an instruction. The servo motor 7 moves a machine through a ball screw, etc.

As described, according to the present invention, data for the interpolation of the involute curve is computed in the numerical control apparatus, and based upon the data thus computed the increment of the angle is controlled so that the tangential speed of the involute curve is made at constant. Therefore, a machining speed for the involute curve is maintained at constant.

We claim:

1. In an involute interpolation speed controlling method for use in machining by a numerical control apparatus, an involute interpolation method for interpolating an involute curve comprising the steps of: instructing a rotational direction of the involute curve, coordinates of an end point, a center position of a base circle as viewed from a start point, a radius (R) of the base circle, and a speed;

obtaining coordinates $(X_0, Y_0)$ of the center of the base circle of the involute curve, an angle ($\theta 2$) of the start point, an angle ($\theta 3$) of the end point and a curve start angle ($\theta 1$) on the basis of the instructions and coordinates $(X_s, Y_s)$ of the start point; and with respect to an involute curve represented by $$X = R\{\cos(\theta+\theta 1) + \theta \sin(\theta+\theta 1)\} + X_0$$

$$Y = R\{\sin(\theta+\theta 1) - \theta \cos(\theta+\theta 1)\} + Y_0$$

increasing $\theta$ in a range from $\theta = (\theta 2 - \theta 1)$ to $\theta = (\theta 3 - \theta 1)$ according to a relation defined by $$\theta_{n+1} = \theta_n + K/(R \cdot \theta)$$

to thereby obtain corresponding points $X_{n+1}$, $Y_{n+1}$ from the above equation.

2. An involute interpolation method according to claim 1, further comprising the step of instructing a designation of a plane.

* * * * *

UNITED STATES PATENT AND TRADEMARK OFFICE
CERTIFICATE OF CORRECTION

PATENT NO. : 4,899,096

DATED : February 6, 1990

INVENTOR(S) : Kawamura et al.

It is certified that error appears in the above-identified patent and that said Letters Patent is hereby corrected as shown below:

| | | |
|---|---|---|
| Col. 1, | line 20, | "provide" should be --provided--; |
| | line 35, | "[Y" should be --Y--. |
| Col. 2, | line 32, | "appratus" should be --apparatus according--; |
| | line 54, | "1s" should be --$\ell$s--; |
| | line 61, | "1e" should be --$\ell$e--; |
| | line 68, | "IJ" should be -- I—J --. |
| Col. 3, | line 34, | "Ye" should be --Ys--; |
| | line 36, | "1s" should be --$\ell$s--; |
| | line 45, | "tangenial" should be --tangential--; |
| | | "1e" should be --$\ell$e--; |
| | line 53, | "point" should be --Point--; |
| | | "angle" should be --Angle--; |
| | line 55, | "1s" should be --$\ell$s--; |
| | line 57, | "1s" should be --$\ell$s--; |
| | line 63, | "values" should be --values,--; |

UNITED STATES PATENT AND TRADEMARK OFFICE
CERTIFICATE OF CORRECTION

PATENT NO. : 4,899,096

DATED : February 6, 1990

INVENTOR(S) : Kawamura et al.

It is certified that error appears in the above-identified patent and that said Letters Patent is hereby corrected as shown below:

Col. 4, line 6, "θ" should be --θ,--;

line 16, "dl" should be --d$\ell$--;

line 20, "dl" should be --d$\ell$--;

line 24, "Δl" should be --Δ$\ell$--;

line 26, "Δl" should be --Δ$\ell$--;

line 29, "Δl" should be --Δ$\ell$--.

Col. 6, line 3, after "(θ+θ1)", second occurrence, insert --}--.

Signed and Sealed this

Twenty-sixth Day of February, 1991

*Attest:*

HARRY F. MANBECK, JR.

*Attesting Officer*  *Commissioner of Patents and Trademarks*